under 35 U.S.C. 154(b) by 58 days.

(12) United States Patent
Kim et al.

(10) Patent No.: US 10,025,275 B2
(45) Date of Patent: Jul. 17, 2018

(54) APPARATUS AND METHOD FOR DISPLAYING INFORMATION

(71) Applicant: Samsung Electronics Co., Ltd., Suwon-si, Gyeonggi-do (KR)

(72) Inventors: Hyunseok Kim, Hwaseong-si (KR); Younghoon Kwak, Suwon-si (KR); Dongkyu Kim, Seoul (KR); Sang-Hyen Park, Seoul (KR); Seungyun Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 15/045,690

(22) Filed: Feb. 17, 2016

(65) Prior Publication Data

US 2016/0240149 A1 Aug. 18, 2016

(30) Foreign Application Priority Data

Feb. 17, 2015 (KR) .................. 10-2015-0024492

(51) Int. Cl.
| | |
|---|---|
| *G04G 21/08* | (2010.01) |
| *G09G 3/36* | (2006.01) |
| *G06F 1/32* | (2006.01) |
| *G04G 9/00* | (2006.01) |
| *G04R 20/26* | (2013.01) |
| *G04C 17/00* | (2006.01) |
| *G04G 11/00* | (2006.01) |
| *G04G 21/02* | (2010.01) |
| *G04G 21/04* | (2013.01) |

(52) U.S. Cl.
CPC ......... *G04G 21/08* (2013.01); *G04C 17/0091* (2013.01); *G04G 9/0023* (2013.01); *G04G 11/00* (2013.01); *G04G 21/02* (2013.01); *G04G 21/04* (2013.01); *G04R 20/26* (2013.01); *G06F 1/3218* (2013.01); *G06F 1/3265* (2013.01); *G09G 3/3648* (2013.01); *G09G 2320/0626* (2013.01); *G09G 2330/021* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 6,580,479 B1 | 6/2003 | Sekiguchi et al. | |
| 2014/0118272 A1* | 5/2014 | Gunn | G06F 3/0488 345/173 |
| 2015/0346694 A1* | 12/2015 | Hoobler | G04G 9/00 368/223 |
| 2016/0231974 A1* | 8/2016 | Lee | G06F 3/1431 |

FOREIGN PATENT DOCUMENTS

| | | |
|---|---|---|
| JP | 2007-057292 A | 3/2007 |
| KR | 2000-0068583 A | 11/2000 |
| KR | 10-2010-0080296 A | 7/2010 |
| KR | 10-2010-0130478 A | 12/2010 |

* cited by examiner

*Primary Examiner* — Joseph Haley
(74) *Attorney, Agent, or Firm* — Jefferson IP Law, LLP

(57) ABSTRACT

An apparatus and a method for displaying information are provided. The method includes, in a standby mode, maintaining a display in a transparent state, the display covering a clock module including hands of a clock, in response to a display event, adjusting transparency of a display area on the display, and displaying information corresponding to the display event on the display area.

16 Claims, 13 Drawing Sheets

APPARATUS AND METHOD FOR DISPLAYING INFORMATION

CROSS-REFERENCE TO RELATED APPLICATION(S)

This application claims the benefit under 35 U.S.C. § 119 of a Korean patent application filed on Feb. 17, 2015 in the Korean Intellectual Property Office and assigned Serial No. 10-2015-0024492, the entire disclosure of which is hereby incorporated by reference.

TECHNICAL FIELD

The present disclosure relates to an electronic device and a method for operating thereof. More particularly, the present disclosure relates to an apparatus and method for displaying information of an electronic device.

BACKGROUND

In general, electronic devices are provided with a variety of functions and perform complex functions. For example, an electronic device is able to perform a mobile communication function, a data communication function, a data output function, a data storage function, an image photographing function, a voice recording function, etc. Such an electronic device is easy to carry. In this case, if the electronic device is implemented in the form of a wearable device, the portability of the electronic device may be optimized. Accordingly, the electronic device is increasingly implemented in the form of a watch. Herein, the electronic device includes a display to display information thereon.

However, the above-described electronic device does not display time information in real time. This is because continuous driving of the display results in significant power consumption. To this end, the electronic device displays time information in response to a user's request. Therefore, a user of an electronic device may be inconvenienced in identifying time information through their electronic device. That is, user convenience and use efficiency of electronic devices may deteriorate.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for displaying information of an electronic device.

In accordance with an aspect of the present disclosure, a method for displaying information is provided. The method includes, in a standby mode, maintaining a display in a transparent state, the display covering a clock module including hands of a clock, in response to a display event, adjusting transparency of a display area on the display, and displaying information corresponding to the display event on the display area.

In accordance with another aspect of the present disclosure, an apparatus for displaying information is provided. The apparatus includes a clock module including hands of a clock, a display covering the clock module, an adjuster configured to adjust transparency of the display, and a controller configured to, in a standby mode, maintain the display in a transparent state, adjust transparency of a display area on the display in response to a display event, and display information corresponding to the display event on the display area.

According to an embodiment, the information display apparatus includes the clock module and the display. In this case, the information display apparatus continues to represent time through the clock module. In addition, in the standby mode, the information display apparatus maintains the display in the transparent state. Accordingly, the user of the information display apparatus can identify the time of the clock module, above the display, in real time. In addition, the information display apparatus displays information on the display by adjusting the transparency of the display in response to the display event. Accordingly, the user of the information display apparatus can easily identify the information. In addition, as the information display apparatus displays information on a certain area of the display, the user of the information display apparatus can identify time with the information. Accordingly, the user of the information display apparatus can easily identify time and information on the information display apparatus. That is, user convenience and use efficiency of the information display apparatus can be improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
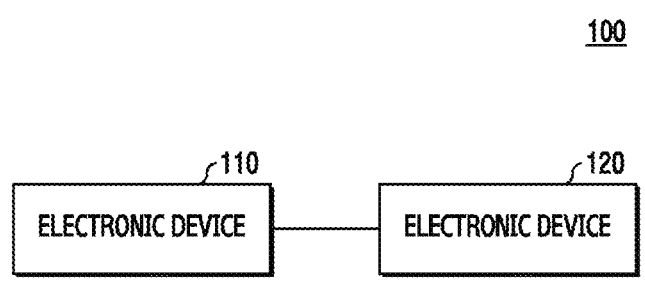
FIG. 1 illustrates a block diagram showing a communication system according to an embodiment of the present disclosure.

FIG. 1 illustrates a block diagram showing a normal communication system according to an embodiment of the present disclosure.

Referring to FIG. 1, the normal communication system 100 includes a plurality of electronic devices 110 and 120. Herein, the electronic devices 110 and 120 may be the same type of devices or may be different types of devices.

The electronic devices 110 and 120 may connect with each other to exchange information with each other. In this case, the electronic devices 110 and 120 may connect with each other wirelessly. Herein, the electronic devices 110 and 120 may connect with each other through a communication network. In addition, the electronic devices 110 and 120 may communicate with each other through a communication network. The electronic devices 110 and 120 may also connect with each other through a wire. For example, the electronic devices 110 and 120 may connect with each other through a cable. In addition, the electronic devices 110 and 120 may interface with each other through a cable.

Figure 2:
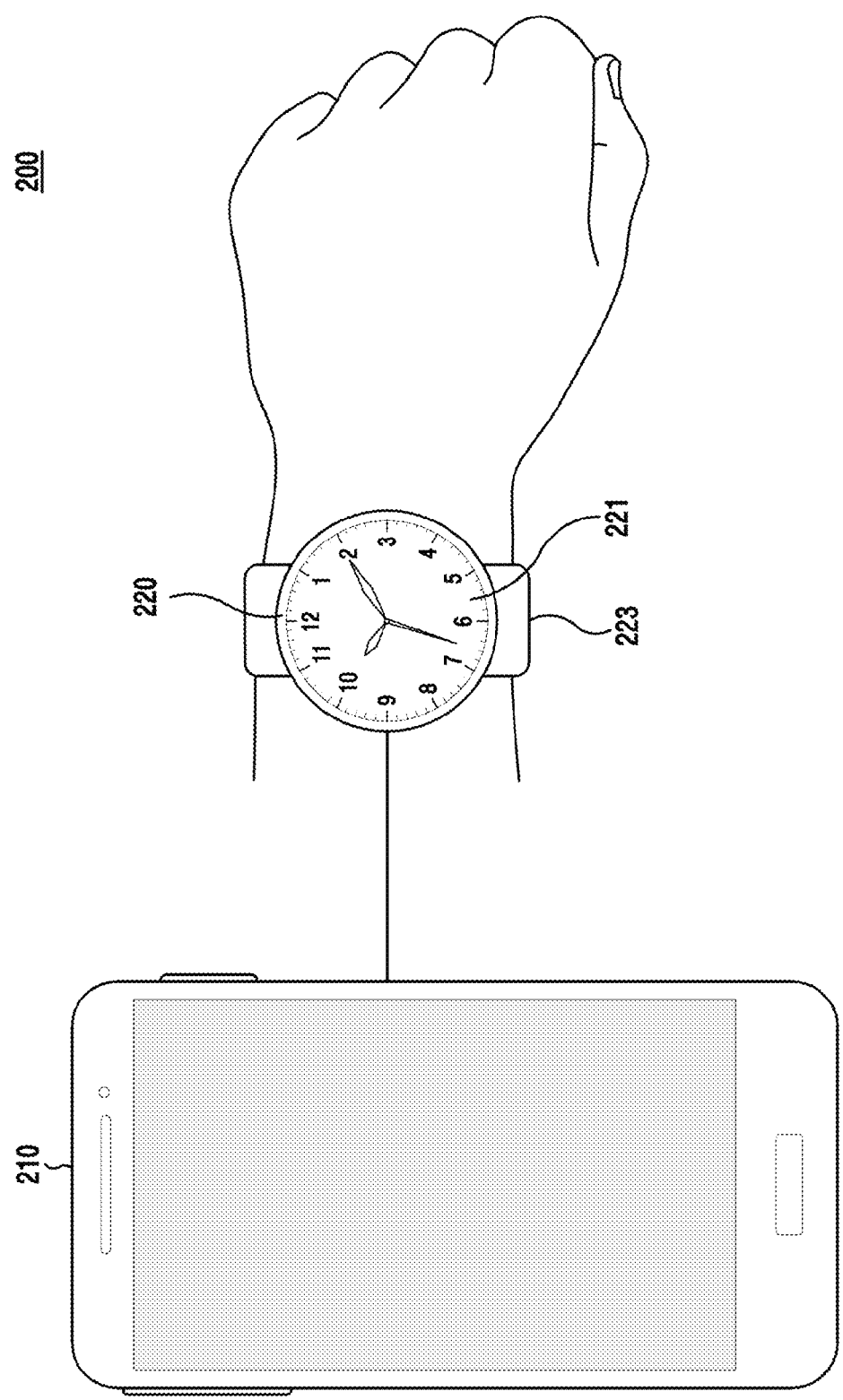
FIG. 2 illustrates a view showing an example of a communication system to which the present disclosure is applied according to an embodiment of the present disclosure.

FIG. 2 illustrates a view showing an example of a communication system to which the present disclosure is applied according to an embodiment of the present disclosure.

Referring to FIG. 2, the communication system 200 includes a first electronic device 210 and a second electronic device 220. Herein, the first electronic device 210 and the second electronic device 220 may be the same type of devices and may be different types of devices.

The first electronic device 210 and the second electronic device 220 may be driven independently from each other. In this case, the first electronic device 210 and the second electronic device 220 may connect with each other. Accordingly, the first electronic device 210 and the second electronic device 220 may exchange information with each other. In addition, each of the first electronic device 210 and the second electronic device 220 may directly connect with an external device (not shown). Accordingly, each of the first electronic device 210 and the second electronic device 220 may exchange information with the external device.

Alternatively, the first electronic device 210 may be driven independently, and the second electronic device 220 may be driven depending on the first electronic device 210. That is, the first electronic device 210 may be driven as a main device and the second electronic device 220 may be driven as a sub device. In this case, the first electronic device 210 may directly connect with an external device. Accordingly, the first electronic device 210 may exchange information with the external device. In addition, the first electronic device 210 and the second electronic device 220 may connect with each other. Accordingly, the second electronic device 220 may exchange information with the external device via the first electronic device 210.

In this case, the first electronic device 210 may include a portable phone, a smart phone, a tablet personal computer (PC), a personal digital assistant (PDA), a portable multimedia player (PMP), a notebook, a netbook, and a wearable device. Herein, the wearable device may include an accessory type device such as a watch type, an ear set type, a glasses type, etc., and a clothing integrated type device which is attached to shoes, a hat, etc. The second electronic device 220 may include a wearable device. In this case, the second electronic device 220 may be implemented in the form of a watch according to an embodiment of the present disclosure.

The second electronic device 220 may include an information display apparatus 221 and a connection member 223. The information display apparatus 221 may exchange information with the first electronic device 210 or an external device in the second electronic device 220. In addition, the information display apparatus 221 may display information. The connection member 223 may be connected to the information display apparatus 221. Herein, the connection member 223 may connect to both ends of the information display apparatus 221 to make a hole with the information display apparatus 221. Accordingly, the user of the second electronic device 220 may wear the second electronic device 220 by passing the user's wrist through the hole.

Figure 3:
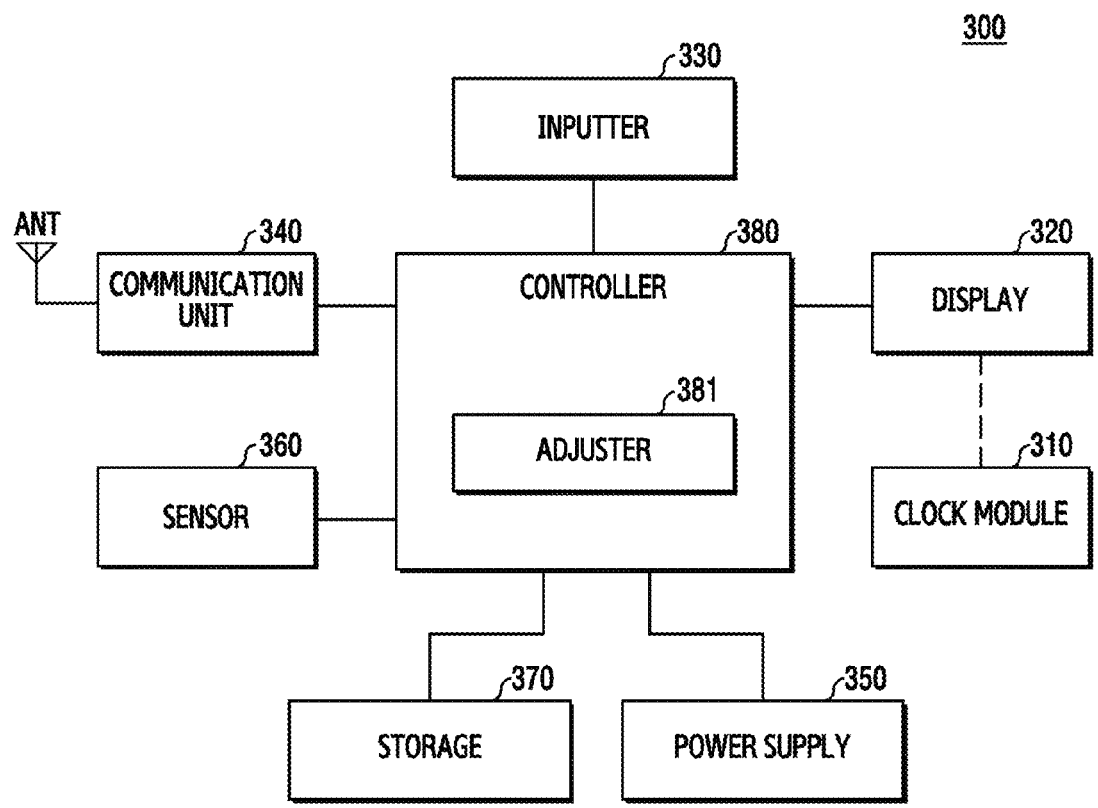
FIG. 3 illustrates a block diagram showing a configuration of an information display apparatus according to an embodiment of the present disclosure.
Figure 4:
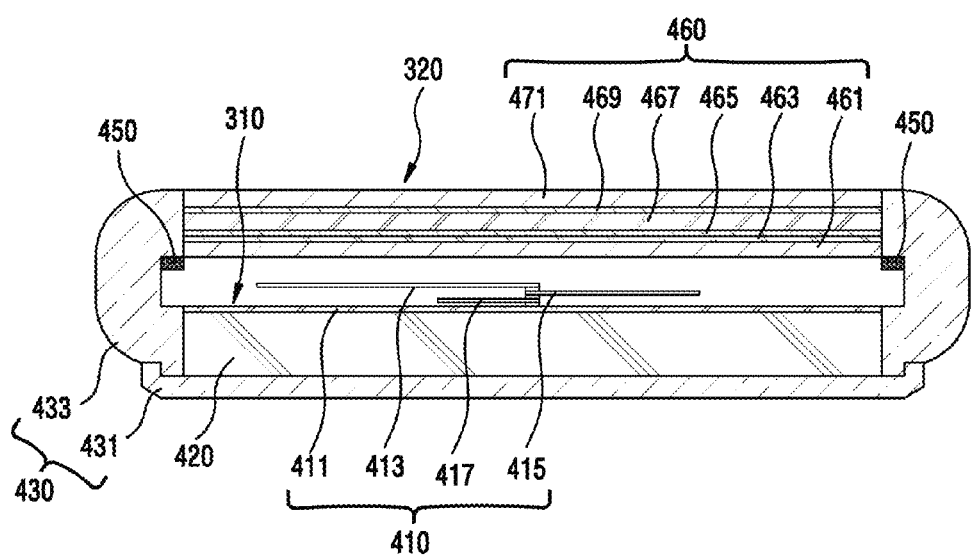
FIG. 4 illustrates a cross section view showing a clock module and a display, such as the display of FIG. 3, according to an embodiment of the present disclosure.

FIG. 3 illustrates a block diagram showing a configuration of an information display apparatus according to an embodiment of the present disclosure. FIG. 4 illustrates a cross section view showing a clock module and a display, such as the display in FIG. 3, according to an embodiment of the present disclosure.

Referring to FIG. 3, the information display apparatus 300 according to an embodiment includes a clock module 310, a display 320, an inputter 330, a communication unit 340, a power supply 350, a sensor 360, a storage 370, and a controller 380.

The clock module 310 represents time in the information display apparatus 300. In this case, the clock module 310 may be implemented in an analog method according to an embodiment of the present disclosure. The clock module 310 includes a time representation part 410, a driving part (movement) 420, and a case 430 as shown in FIG. 4.

The time representation part 410 includes a dial 411 and hands of a clock 413, 415, and 417. The dial 411 has divisions. The hands 413, 415, and 417 include a second hand 413, a minute hand 415, and an hour hand 417. In this case, the hands 413, 415, and 417 are arranged on the upper portion of the dial 411. Herein, the hands 413, 415, and 417 may be secured to a certain point of the dial 411 to be able to individually rotate about the point.

The driving part 420 rotates the hands 413, 415, and 417 on the upper portion of the dial 411 to represent time. In this case, the driving part 420 is arranged on the lower portion of the dial 411. In addition, the driving part 420 is driven using electric energy. Herein, the driving part 420 may be provided with a battery and may be driven using electric energy in the battery.

The case 430 accommodates the time representation part 410 and the driving part 420. In this case, the case 430 has an opening formed above the time representation part 410. Herein, the case 430 includes a lower case 431 and a lateral case 433. The lower case 431 may be arranged on the lower portion of the driving part 420. The lateral case 433 may be arranged at the sides of the time representation part 410 and the driving part 420. That is, the lateral case 433 may enclose the time representation part 410 and the driving part 420. In addition, the lateral case 433 may be secured to the edges of the lower case 431.

The display 320 outputs display data in the information display apparatus 300. In this case, the display 320 covers the upper portion of the clock module 310. Herein, the display 320 may be connected to the case 430. That is, the display 320 may be secured to the lateral case 433 at the edges of the display 320. Accordingly, the display 320 may be distanced from the clock module 310.

In addition, the transparency of the display 320 may be adjusted. Herein, the transparency of the display 320 may be adjusted in part. Accordingly, the display 320 may switch between at least two states of a transparent state, a translucent state, or an opaque state. Herein, when the display 320 is in the transparent state or the translucent state, the time representation part 410 can be seen through the display 320. That is, the user of the information display apparatus 300 can identify time of the time representation part 410 above the display 320. On the other hand, when the display 320 is in the translucent state or the opaque state, the display 320 may output display data. The display 320 may be implemented by using a transparent liquid crystal display (TLCD), a transparent organic light emitting diode (TOLED) display, or an electronic paper display. In this case, when the display 320 is implemented by using the TLCD, the display 320 may include a light emitter 450 and a display panel 460 as shown in FIG. 4.

The light emitter 450 may generate and output light. In this case, the light emitter 450 may be arranged on the lower portion of the display panel 460. Herein, the light emitter 450 may be arranged between the clock module 310 and the display panel 460. In addition, the light emitter 450 may be arranged on an edge area of the display panel 460. Herein, the light emitter 450 may be arranged on the edge area of the display panel 460 inside the case 430. For example, the light emitter 450 may be arranged on at least some areas inside the case 430. Accordingly, the light emitter 450 may output light to a space between the clock module 310 and the display panel 460. Herein, the light emitter 450 may not be exposed to the outside. That is, even when the display 320 is in the transparent state or the translucent state, the light emitter 450 may not be seen from the outside.

The display panel 460 may output display data using light. In this case, the display panel 460 may be arranged on the upper portion of the light emitter 450. The display panel 460 may include a lower panel 461, an optical panel 463, a lower polarization plate 465, a liquid crystal panel 467, an upper polarization plate 469, and an upper panel 471.

The lower panel 461 may allow light to pass therethrough. In this case, the lower panel 461 may be arranged on the upper portion of the light emitter 450. In addition, when light enters from the light emitter 450, the lower panel 461 may allow the light to pass therethrough and move up. The lower panel 461 may support the optical panel 463, the lower polarization plate 465, the liquid crystal panel 467, the upper polarization plate 469, and the upper panel 471. Herein, the lower panel 461 may be distanced from the clock module 410. In addition, the lower panel 461 may be formed of a transparent material. For example, the lower panel 461 may be formed of at least one of acryl, polymer, or tempered glass.

The optical panel 463 may improve the characteristic of light. In this case, the optical panel 463 may be arranged on the upper portion of the lower panel 461. In addition, when light enters from the lower panel 461, the optical panel 463 may uniformly diffuse the light and emit the light upwardly. The optical panel 463 may include at least one of a polarization plate, a prism plate, or a diffusion plate.

The lower polarization plate 465 may convert light into linearly polarized light. In this case, the lower polarization plate 465 may be arranged on the upper portion of the optical panel 463. In addition, when light enters from the optical panel 463, the lower polarization plate 465 may convert the light into linearly polarized light and emit the light upwardly.

The liquid crystal panel 467 may process light in response to display data. In this case, the liquid crystal panel 467 may be arranged on the upper portion of the lower polarization plate 465. In addition, when light enters from the lower polarization plate 465, the liquid crystal panel 467 may process the light.

The liquid crystal panel 467 may include a transparent thin film transistor (TFT) substrate, a color filter (CF) substrate, and a liquid crystal layer. In this case, the transparent TFT substrate and the CF substrate may adhere to each other, thereby maintaining a uniform cell gap. In addition, the liquid crystal layer may be interposed between the transparent TFT substrate and the CF substrate. The transparent TFT substrate may change the arrangement of liquid crystals in the liquid crystal layer. In addition, the transparent TFT substrate may allow light to pass therethrough and move toward the liquid crystal layer. Herein, the transparent TFT substrate may be formed of a transparent material. For example, the transparent TFT substrate may be formed of at least one of zinc oxide and titanium oxide. The liquid crystal layer may allow at least part of light to pass therethrough according to the arrangement of liquid crystals. Herein, the liquid crystal layer may refract light. The CF substrate may represent light in predetermined color.

The upper polarization plate 469 may convert light into linearly polarized light. In this case, the upper polarization plate 469 may be arranged on the upper portion of the liquid crystal panel 467. In addition, when light enters from the liquid crystal panel 467, the upper polarization plate 469 may convert the light into linearly polarized light and emit the light upwardly.

The upper panel 471 may allow light to pass therethrough. In this case, the upper panel 471 may be arranged on the upper portion of the upper polarization plate 469. In addition, when light enters from the upper polarization plate 469, the upper panel 470 may allow the light to pass therethrough and move up. The upper panel 471 may protect the lower panel 461, the optical panel 463, the lower polarization plate 465, the liquid crystal panel 467, and the upper polarization plate 469. For example, the upper panel 471 may be formed of at least one of acryl, polymer, or tempered glass.

The inputter 330 may generate input data in the information display apparatus 300. In this case, the inputter 330 may generate the input data in response to a user input to the information display apparatus 300. In addition, the inputter 330 may include at least one inputting means. The inputter 330 may include a key pad, a dome switch, a physical button, a touch panel, and a jog and shuttle. In addition, the inputter 330 may be connected with the display 320 to be implemented as a touch screen.

The communication unit 340 wirelessly communicates in the information display apparatus 300. In this case, the communication unit 340 may communicate in various communication methods. To achieve this, the communication unit 340 may connect to at least one of a mobile communication network or a data communication network. Alternatively, the communication unit 310 may perform short-distance communication. In addition, the communication methods may include long term evolution (LTE), wideband code division multiple access (WCDMA), global system for mobile communications (GSM), wireless fidelity (WiFi), bluetooth, bluetooth low energy (BLE), Jigbee, infrared data association (IrDA), and near field communication (NFC).

The power supply 350 supplies power in the information display apparatus 300. In this case, the power supply 350 may receive power from an external power source to be charged. Herein, the power supply 350 may be connected to the external power source through a wire to receive power. Alternatively, the power supply 350 may wirelessly connect to the external power source to receive power. In addition, the power supply 350 may convert and store power. In addition, the power supply 350 may supply power to the elements of the information display apparatus 300.

The sensor 360 may sense a change in the posture of the information display apparatus 300. In this case, the sensor 360 may sense a change in the posture of the clock module 310. For example, the sensor 360 may include an acceleration sensor, a geomagnetism sensor, and a gyroscope sensor.

The storage 370 stores operation programs of the information display apparatus 300. In this case, the storage 370 may store a program for adjusting the transparency of the display 320. In addition, the storage 370 may store a program for converting the display 320 from the transparent state into the translucent state or the opaque state and displaying information. In addition, the storage 370 may store data which is generated while the operation programs are being executed.

The controller 380 controls the overall operations of the information display apparatus 300. In this case, the controller 380 controls the display 320 according to an operation mode. That is, the controller 380 adjusts the transparency of the display 320. Herein, when the clock module 310 is not provided with a battery, the controller 380 may control the power supply 350 to continuously supply electric energy to the clock module 310.

For example, in a standby mode, the controller 380 may maintain the display 320 in the transparent state. To achieve this, the controller 380 may not drive the display 320. Herein, the controller 380 may not supply electric energy to the display 320.

In addition, the controller 380 adjusts the transparency of the display 320 in response to a display event. Herein, the controller 380 may adjust the transparency of the display 320 in part. Accordingly, the controller 380 may convert the display 320 from the transparent state into the translucent state or the opaque state. In addition, the controller 380 may output display data through the display 320. Herein, the controller 380 may display information corresponding to the display event. To achieve this, the controller 380 may drive the display 320. Herein, the controller 380 may control the power supply 350 to supply electric energy to the display 320.

The controller 380 includes an adjuster 381. The adjuster 381 may adjust the transparency of the display 320. In this case, the adjuster 381 may apply a voltage to the liquid crystal panel 467 of the display 320 to convert the display 320 from the transparent state into the translucent state or the opaque state. Herein, the adjuster 381 may apply a voltage to the liquid crystal panel 467 to adjust the transparency of the display 320 in part. That is, when the controller 380 senses generation of a display event, the adjuster 381 may apply a voltage to the liquid crystal panel 467.

Figure 5:
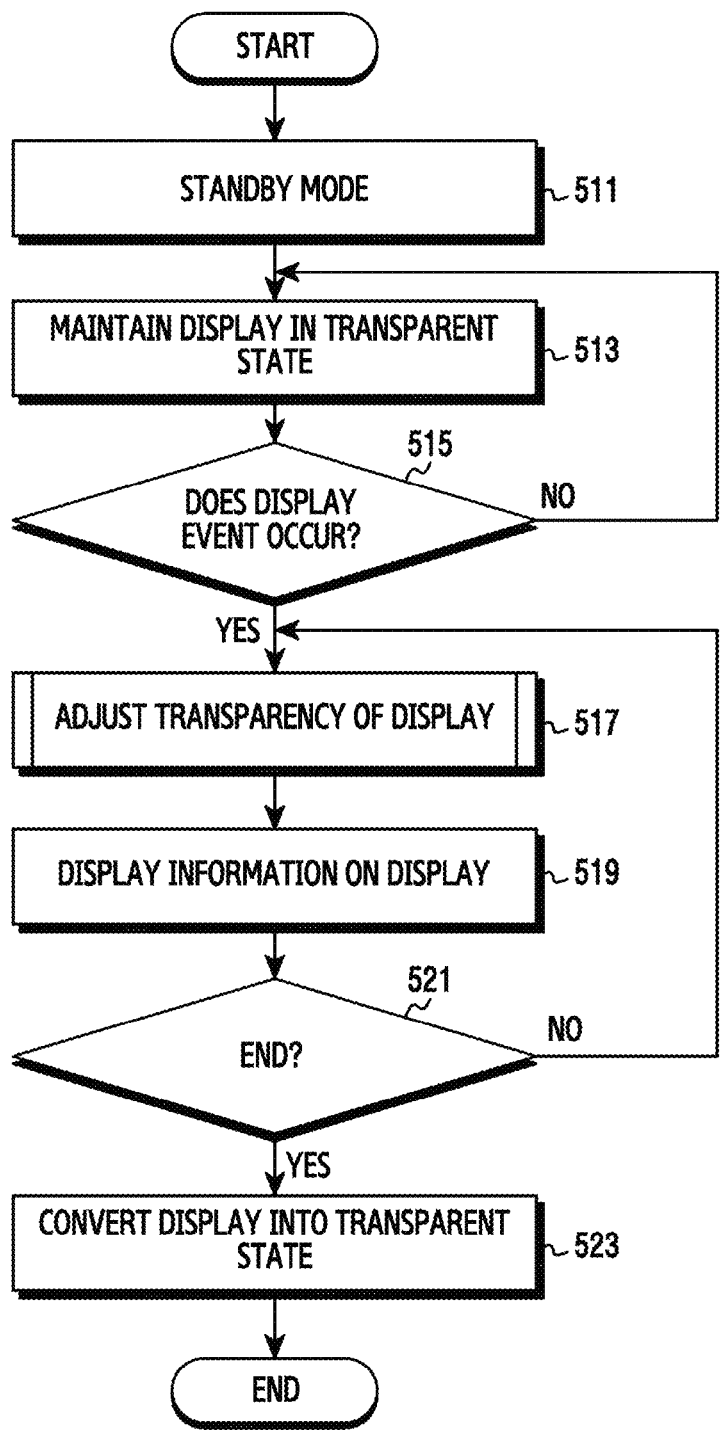
FIG. 5 illustrates a sequence diagram showing a procedure of performing an information display method according to an embodiment of the present disclosure.

FIG. 5 illustrates a sequence diagram showing a procedure of performing an information display method according to an embodiment of the present disclosure. In addition, FIGS. 8 to 13 illustrate views to explain the information display method according to an embodiment of the present disclosure.

Figure 8:
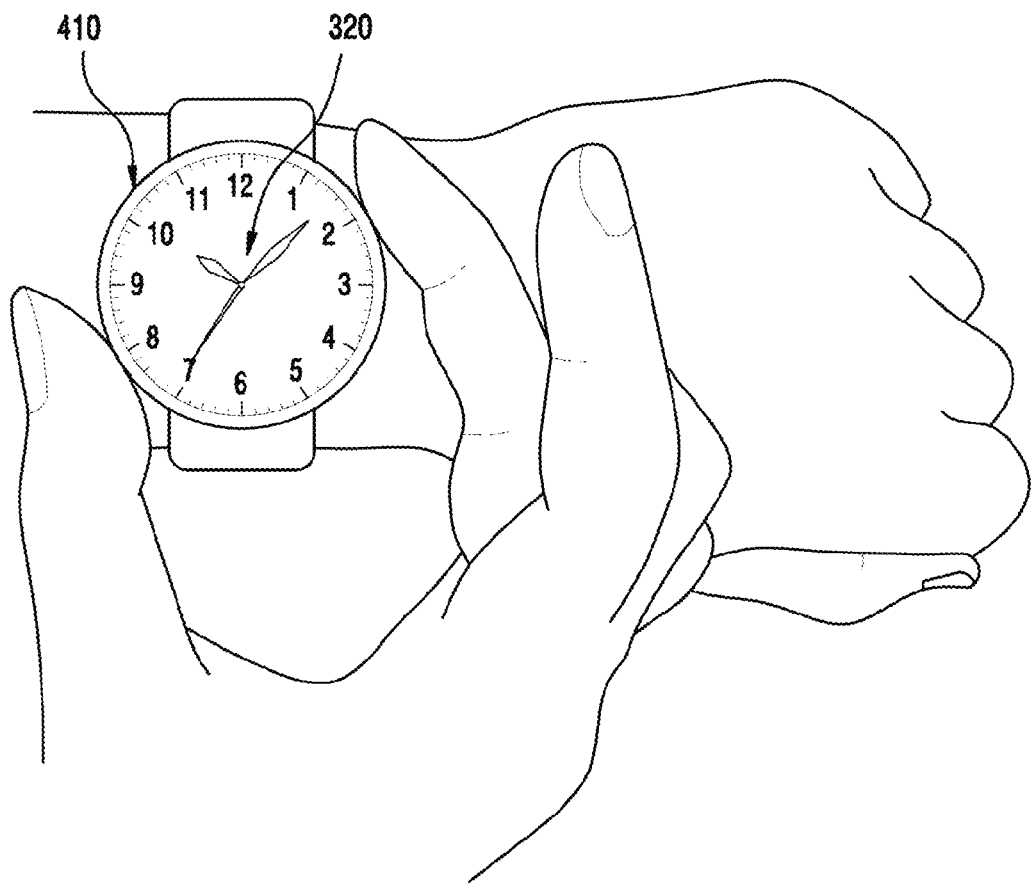
FIGS. 8 to 13 illustrate views to explain an information display method according to an embodiment of the present disclosure.

Referring to FIG. 5, the information display method starts with operation 511 in which the controller 380 performs a standby mode. In this case, the controller 380 may maintain the display 320 in the transparent state in operation 513. To achieve this, the controller 380 may not drive the display 320. Herein, the controller 380 may not supply electric energy to the display 320. In this case, the display 320 may cover the upper portion of the clock module 310. That is, the controller 380 may maintain the display 320 in the transparent state above the clock module 310 as shown in FIG. 8. Accordingly, the time representation part 410 of the clock module 310 may be seen through the display 320. That is, the user of the information display apparatus 300 may identify time of the time representation part 410 above the display 320.

When a display event occurs, the controller 380 senses the display event in operation 515. In this case, when information is received from an external device, the communication unit 340 may generate the display event. Alternatively, when a display request is inputted by the user of the information display apparatus 300, the inputter 330 may generate the display event. To achieve this, information may be pre-stored in the storage 370. Alternatively, when the posture of the information display apparatus 300 is changed, the sensor 360 may generate the display event. To achieve this, information may be pre-stored in the storage 370. For example, the sensor 360 may sense a change in the posture of the information display apparatus 300 in response to the user of the information display apparatus 300 performing an action to identify the clock module 310 or the display 320. Herein, a condition for generating the display event may be pre-set in the storage 370. When the display event is not sensed in operation 515, the controller 380 returns to operation 513. In this case, the controller 380 may repeat operations 513 and 515.

Figure 6:
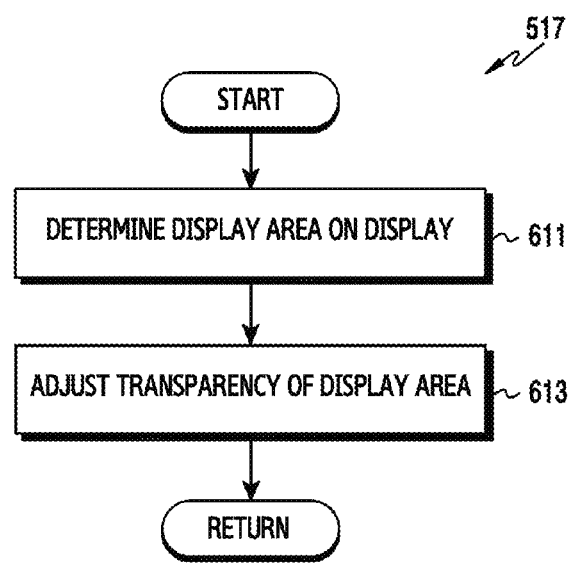
FIG. 6 illustrates a sequence diagram showing an example of the operation of adjusting transparency of the display in FIG. 5 according to an embodiment of the present disclosure.
Figure 7:
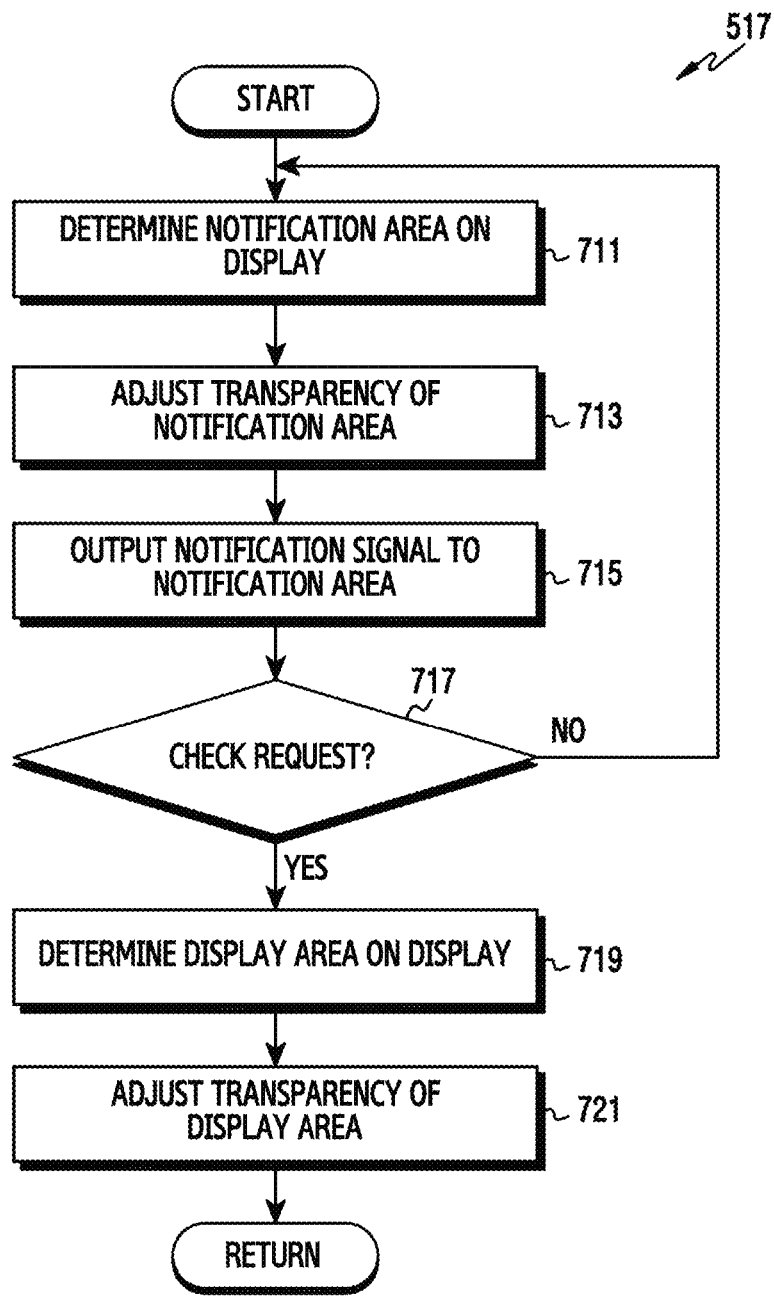
FIG. 7 illustrates a sequence diagram showing another example of the operation of adjusting transparency of the display in FIG. 5 according to an embodiment of the present disclosure.

The controller 380 may adjust the transparency of the display 320 in operation 517. In this case, the controller 380 may drive the display 320. Herein, the controller 380 may control the power supply 350 to supply electric energy to the display 320. In addition, the adjuster 381 may apply a voltage to the liquid crystal panel 467. Accordingly, the controller 380 may convert the display 320 from the transparent state into the translucent state or the opaque state. Herein, the controller 380 may adjust the transparency of the display 320 in part. For example, when the display event is generated as information is received from an external device or a display request is inputted by the user of the information display apparatus 300, the controller 380 may adjust the transparency of the display 320 as shown in FIG. 6. Alternatively, when the display event is generated as information is received from an external device, a display request is inputted by the user of the information display apparatus 300, or the posture of the information display apparatus 300 is changed, the controller 380 may adjust the transparency of the display 320 as shown in FIG. 7.

FIG. 6 illustrates a sequence diagram showing an example of the operation of adjusting the transparency of the display in FIG. 5 according to an embodiment of the present disclosure.

Figure 11:
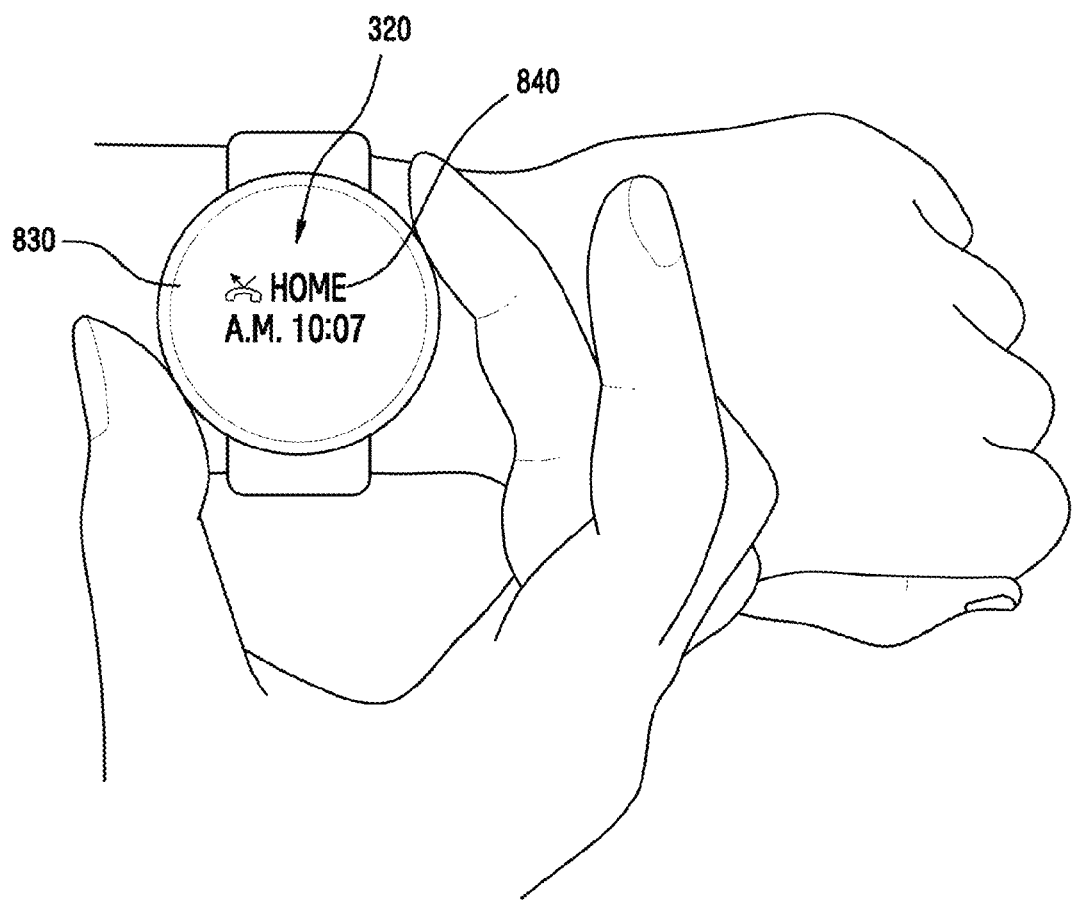
Figure 12:
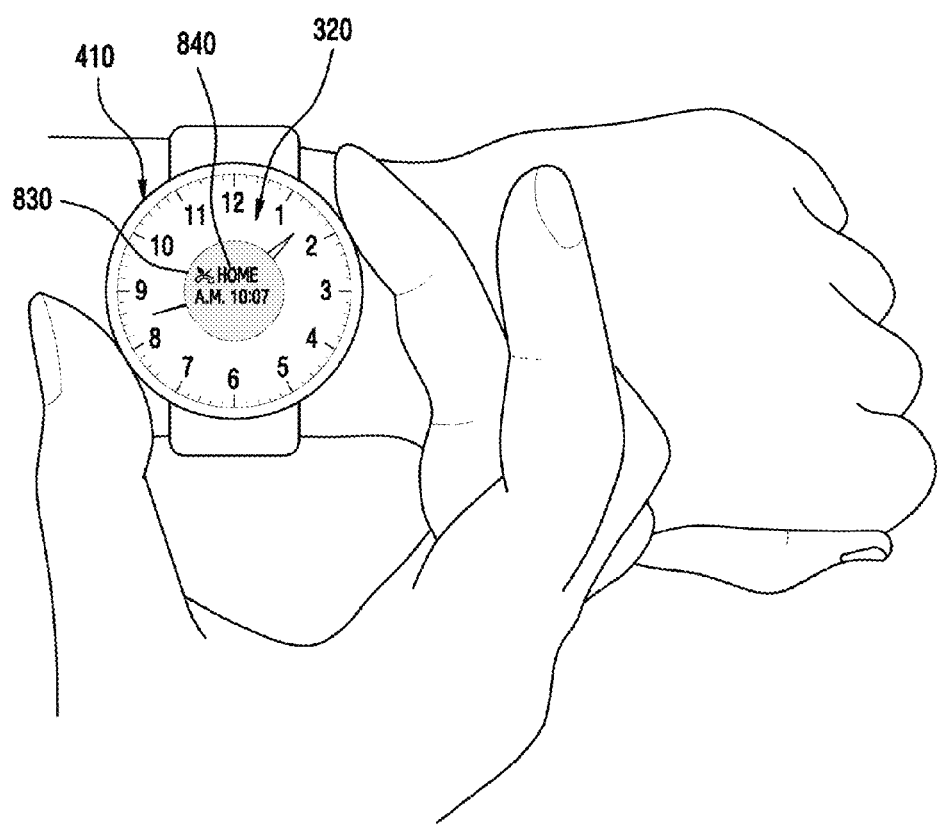
Figure 13:
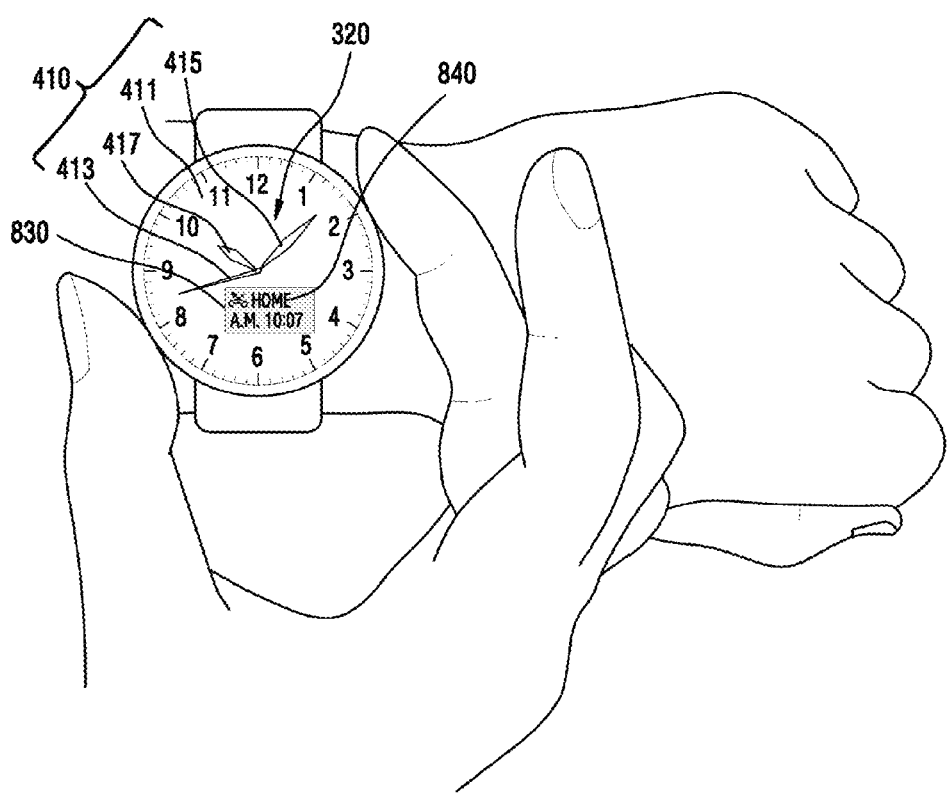

Referring to FIG. 6, the controller 380 determines a display area 830 on the display 320 in operation 611. That is, the controller 380 may determine at least one display area 830 on at least some area(s) of the display 320. Herein, the controller 380 may determine the display area 830 on the entire area of the display 320 as shown in FIG. 11. Alternatively, the controller 380 may determine the display area 830 on a certain area of the display 320 as shown in FIG. 12 or 13. Although not shown, the controller 380 may determine a plurality of display areas 830 on the display 320.

In this case, the controller 380 may determine the display area 830 on a predetermined area of the display 320 as shown in FIG. 12. For example, the controller 380 may determine the display area 830 on a part of the middle area or the border area of the display 320. Alternatively, the controller 380 may variably determine the display area 830 on the display 320 as shown in FIG. 13. For example, the controller 380 may determine the display area 830 on the display 320 not to overlap the hands 413, 415, and 417 of the time representation part 410. In that case, the controller 380 may detect the present time. In addition, the controller 380 may determine the locations of the hands 413, 415, and 417 above the dial 411 by analyzing the present time. Thereafter, the controller 380 may determine the display area 830 between the hands 413, 415, and 417.

The controller 380 adjusts the transparency of the display area 830 on the display 320 in operation 613. That is, the controller 380 may convert the display area 830 on the display 320 from the transparent state into the translucent state or the opaque state. In this case, the controller 380 may drive the display 320. Herein, the controller 380 may control the power supply 350 to supply electric energy to the display 320. In addition, the adjuster 381 may apply a voltage to the liquid crystal panel 467. Herein, the adjuster 381 may apply a voltage to at least some areas of the liquid crystal panel 467 corresponding to the display area 830. That is, the adjuster 380 may apply a voltage to the entire area of the liquid crystal panel 467. Alternatively, the adjuster 380 may apply a voltage to some areas of the liquid crystal panel 467. Accordingly, the arrangement of liquid crystals in at least some areas of the liquid crystal panel 467 is changed such that the transparency of the display area 830 on the display 320 is adjusted. Thereafter, the controller 380 may return to FIG. 5.

FIG. 7 illustrates a sequence diagram showing another example of the operation of adjusting the transparency of the display in FIG. 5 according to an embodiment of the present disclosure.

Figure 9:
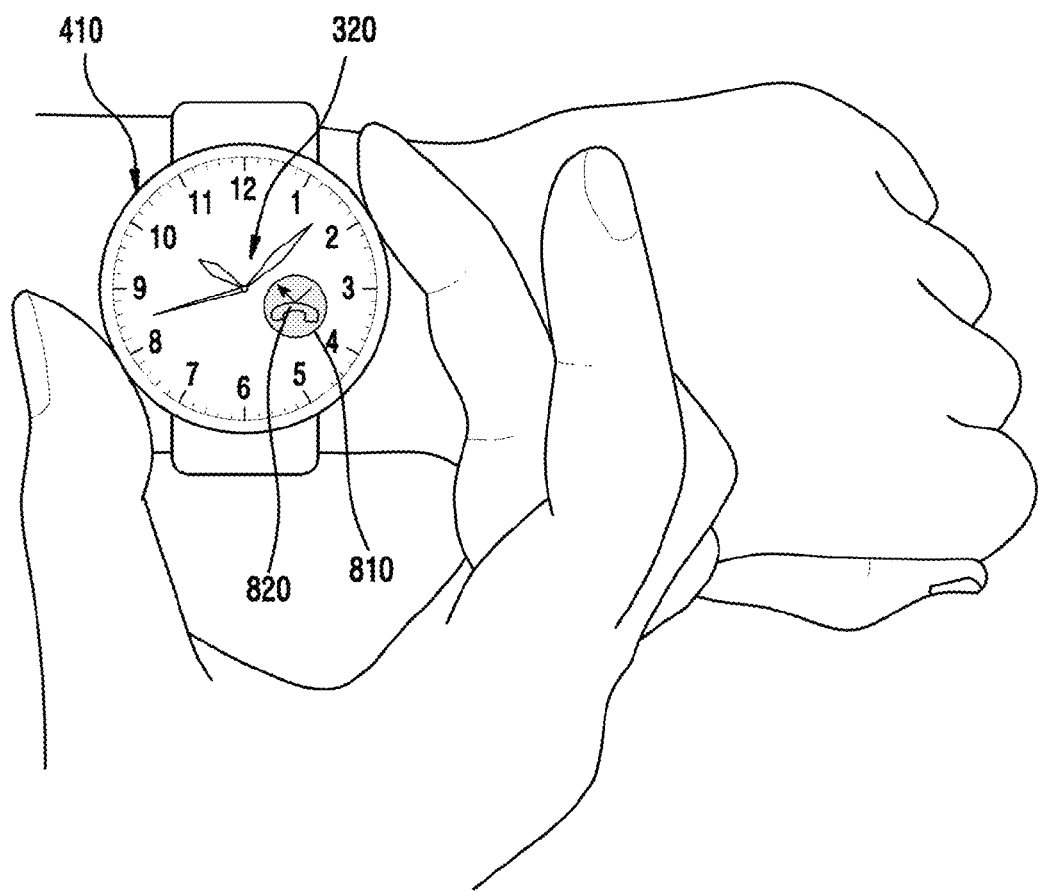
Figure 10:
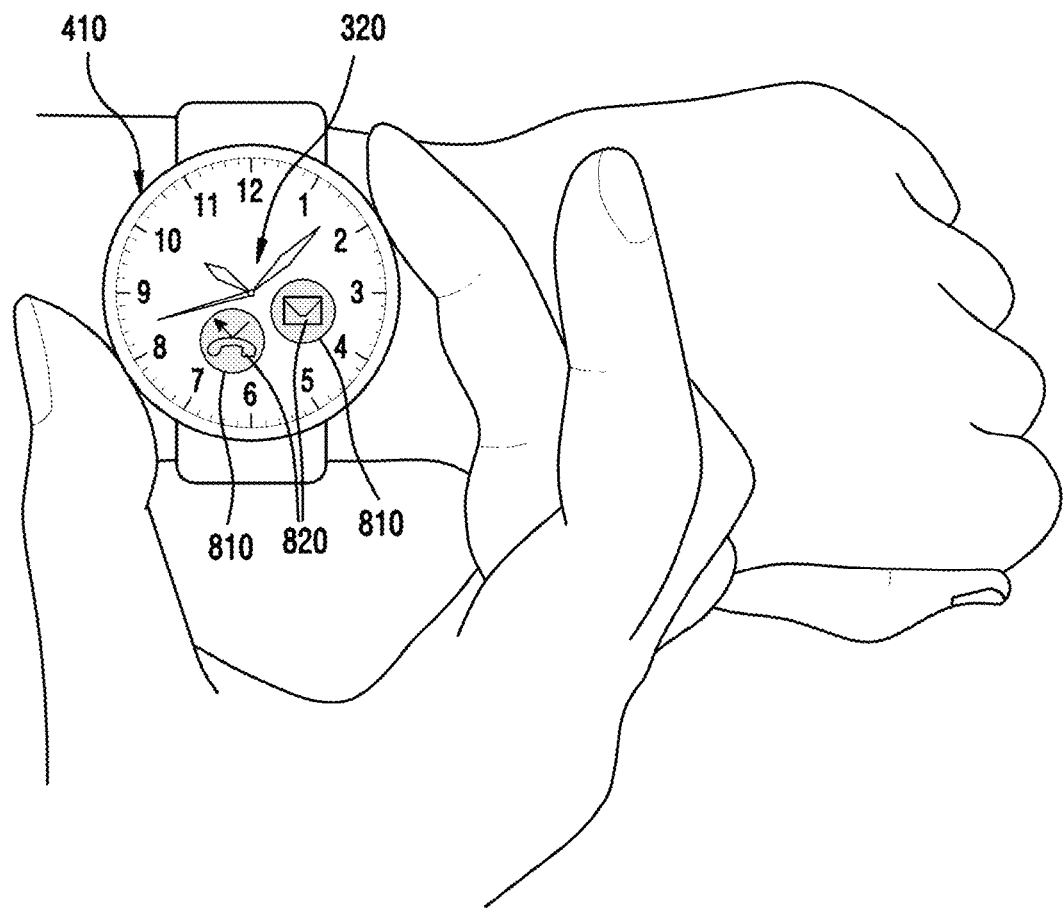

Referring to FIG. 7, the controller 380 determines a notification area 810 on the display 320 in operation 711. That is, the controller 380 may determine at least one notification area 810 on at least some areas of the display 320. Herein, the controller 380 may determine one notification area 810 on the display 320 as shown in FIG. 9. Alternatively, the controller 380 may determine a plurality of notification areas 810 on the display 320 as shown in FIG. 10. For example, when a notification area 810 corresponding to a previous display event exists on the display 320, the controller 320 may additionally determine another notification area 810 in response to a present display event.

In this case, the controller 380 may determine the notification area 810 on a predetermined area of the display 320. For example, the controller 380 may determine the notification area 810 on a part of the middle area or the border area of the display 320. Alternatively, the controller 380 may variably determine the notification area 810 on the display 320 as shown in FIG. 9 or 10. For example, the controller 380 may determine the notification area 810 on the display 320 not to overlap the hands 413, 415, and 417 of the time representation part 410. In that case, the controller 380 may detect present time. In addition, the controller 380 may determine the locations of the hands 413, 415, and 417 above the dial 411 by analyzing the present time. Thereafter, the controller 380 may determine the notification area 810 between the hands 413, 415, and 417.

The controller 380 adjusts the transparency of the notification area 810 on the display 320 in operation 713. That is, the controller 380 may convert the notification area 810 on the display 320 from the transparent state into the translucent state or the opaque state. In this case, the controller 380 may drive the display 320. Herein, the controller 380 may control the power supply 350 to supply electric energy to the display 320. In addition, the adjuster 381 may apply a voltage to the liquid crystal panel 467. Herein, the adjuster 380 may apply a voltage to at least some areas of the liquid crystal panel 457 corresponding to the notification area 810. That is, the adjuster 380 may apply a voltage to the entire area of the liquid crystal panel 467. Alternatively, the adjuster 380 may apply a voltage to some areas of the liquid crystal panel 467. Accordingly, the arrangement of liquid crystals in at least some areas of the liquid crystal panel 467 is changed such that the transparency of the notification area 810 on the display 320 is adjusted.

The controller 380 outputs a notification signal 820 to the notification area 810 of the display 320 in operation 715. In this case, the controller 380 may output the notification signal 820 to the notification area 810 as shown in FIG. 9 or 10. Herein, the controller 380 may display the notification signal 820 using at least one of an image or a text. For example, the controller 380 may display the notification signal 820 using an icon. Alternatively, the controller 380 may output the notification signal 820 using a color signal. For example, the controller 380 may output the notification signal 820 using a predetermined color signal in response to an attribute of displayable information.

When a check request is made, the controller 380 may sense the check request in operation 717. In this case, when the check request is inputted by the user of the information display apparatus 300, the inputter 330 may generate a check event. Herein, the display 320 and the inputter 330 may be implemented as a touch screen. In this case, when a touch is generated on the notification area 810, the inputter 330 may generate the check event.

On the other hand, when the check event is not sensed in operation 717, the controller 380 returns to operation 711. In this case, the controller 380 may repeat operations 711 to 717. That is, the controller 380 may display the notification signal 820 by continuously adjusting the transparency of the display 320. Herein, when a certain area of the display 320 is determined as the notification area 810, the controller 380 may change the notification area 810 on the display 320. That is, the controller 380 may move the notification area 810 on the display 320. For example, the controller 380 may move the notification area 810 in response to movement of the hands 413, 415, and 417 so as not to overlap the hands 413, 415, and 417 of the time representation part 410.

The controller 380 may determine a display area 830 on the display 320 in operation 719. That is, the controller 380 may determine at least one display area 830 on at least some area(s) of the display 320. Herein, the controller 380 may determine the display area 830 on the entire area of the display 320 as shown in FIG. 11. Alternatively, the controller 380 may determine the display area 830 on a certain area of the display 320 as shown in FIG. 12 or 13. Although not shown, the controller 380 may determine a plurality of display areas 830 on the display 320.

In this case, the controller 380 may determine the display area 830 on a predetermined area of the display 320 as shown in FIG. 12. For example, the controller 380 may determine the display area 830 on a part of the middle area or the border area of the display 320. Alternatively, the controller 380 may variably determine the display area 830 on the display 320 as shown in FIG. 13. For example, the controller 380 may determine the display area 830 on the display 320 not to overlap the hands 413, 415, and 417 of the time representation part 410. In that case, the controller 380 may detect present time. In addition, the controller 380 may determine the locations of the hands 413, 415, and 417 above the dial 411 by analyzing the present time. Thereafter, the controller 380 may determine the display area 830 between the hands 413, 415, and 417.

The controller 380 adjusts the transparency of the display area 830 on the display 320 in operation 721. That is, the controller 380 may convert the display area 830 on the display 320 from the transparent state into the translucent state or the opaque state. In this case, the controller 380 may drive the display 320. Herein, the controller 380 may control the power supply 350 to supply electric energy to the display 320. In addition, the adjuster 381 may apply a voltage to the liquid crystal panel 467. Herein, the adjuster 380 may apply a voltage to at least some areas of the liquid crystal panel 467 corresponding to the display area 830. That is, the adjuster 380 may apply a voltage to the entire area of the liquid crystal panel 467. Alternatively, the adjuster 380 may apply a voltage to some areas of the liquid crystal panel 467. Accordingly, the arrangement of liquid crystals in at least some areas of the liquid crystal panel 467 is changed such that the transparency of the display area 830 on the display 320 is adjusted. Thereafter, the controller 380 may return to FIG. 5.

The controller 380 may display information 840 on the display 320 in operation 519. In this case, the controller 380 displays the information 840 on the display area 830 of the display 320 as shown in FIG. 11, 12 or 13. Herein, the controller 380 may display the information 840 using at least one of an image or a text. In addition, the controller 380 may output a color signal to the display area 830. For example, the controller 380 may output a predetermined color signal in response to an attribute of the information 840. In addition, when an additional operation event occurs while the information 840 is being displayed on the display area 830 of the display 320, the controller 380 may change the information 840 and display the information 840 on the display area 830. Herein, the controller 380 may change the display area 830 on the display 320. For example, the controller 830 may magnify or reduce the display area 830 on the display 320, and may move the display area 830 on the display 320.

When an end event occurs, the controller 380 may sense the end event in operation 521. In this case, when an end request is inputted by the user of the information display apparatus 300, the inputter 330 may generate the end event. Alternatively, when a predetermined time elapses while the information 840 is being displayed on the display area 830 of the display 320, the controller 380 may generate the end event. Herein, when the additional operation event does not occur while the information 840 is being displayed on the display area 830 of the display 320, the controller 380 may generate the end event in response to the predetermined time elapsing. On the other hand, when the additional operation event occurs while the information 840 is being displayed on the display area 830 of the display 320, and a predetermined time elapses from the time when the additional operation event occurs, the controller 380 may generate the end event.

When the end event is not sensed in operation 521, the controller 380 returns to operation 517. In this case, the controller 380 may repeat operations 517 to 521. That is, the controller 380 displays the information 840 by continuously adjusting the transparency of the display 320. Herein, when a certain area of the display 320 is determined as the display area 830, the controller 380 may change the display area 830 on the display 320. That is, the controller 380 may move the display area 830 on the display 320. For example, the controller 380 may move the display area 830 in response to movement of the clocks 413, 415, and 417 so as not to overlap the hands 413, 415, and 417 of the time representation part 410.

Finally, the controller 380 converts the display 320 into the transparent state in operation 523. To achieve this, the controller 380 may stop driving the display 320. Herein, the controller 380 may shut off supply of electric energy to the display 320. That is, the controller 380 may convert the display 320 into the transparent state above the clock module 310 as shown in FIG. 8. Accordingly, the time representation part 410 of the clock module 310 can be seen through the display 320. That is, the user of the information display apparatus 300 can identify time of the time representation part 410 above the display 320.

In the various embodiments, the controller 380 continuously displays the notification area 810 on the display 320. However, this should not be considered as limiting. That is, when a predetermined time elapses while the notification signal 820 is being outputted to the notification area 810 of the display 320, the controller 380 may proceed to operation 521. For example, when the check request is not sensed while the notification signal 820 is being outputted to the notification area 810 of the display 320, the controller 380 may generate the end event in response to the predetermined time elapsing. In addition, the controller 380 may perform operations 521 and 523.

According to an embodiment of the present disclosure, the information display apparatus 300 includes the clock module 310 and the display 320. In this case, the information display apparatus 300 continues to represent time through the clock module 310. In addition, in the standby mode, the information display apparatus 300 maintains the display 320 in the transparent state. Accordingly, the user of the information display apparatus 300 can identify time of the clock module 310 above the display 320 in real time. In addition, the information display apparatus 300 displays information on the display 320 by adjusting the transparency of the display 320 in response to the display event. Accordingly, the user of the information display apparatus 300 can easily identify the information. In addition, as the information display apparatus 300 displays information on a certain area of the display 320, the user of the information display apparatus 300 can identify time with the information.

Accordingly, the user of the information display apparatus 300 can easily identify time and information on the information display apparatus 300. That is, user convenience and use efficiency of the information display apparatus 300 can be improved.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for displaying information in an apparatus comprising a clock module and a display covering the clock module, the clock module comprising at least one clock hand indicating a current time, the method comprising:
   maintaining the display with a transparent state while the apparatus operates in an idle state;
   in response to detecting a display event, determining, based on a location of each of the at least one clock hand, at least one display area for outputting information corresponding to the display event in an entire area of the display with the transparent state;
   displaying, by adjusting a transparency of the at least one display area, the information within the at least one display area;
   changing a location of the at least one display area based on a movement of each of the at least one clock hand; and
   displaying the information within the at least one display area located at the changed location,
   wherein the determining of the at least one display area comprises:
      in response to receiving data from an electronic device, determining at least a partial area of the display as a notification area for displaying an object for notifying that the data is received;
      displaying, by adjusting a transparency of the notification area, the object within the notification area; and
      in response to receiving a user input on the notification area, determining the at least one display area for displaying the information included in the data.

2. The method of claim 1, wherein the location of the at least one display area is different from the location of each of the at least one clock hand.

3. The method of claim 1, wherein the at least one display area is not superimposed over the each of the at least one clock hand.

4. The method of claim 1, wherein the clock module is capable of being controlled by a controller in a mechanical manner.

5. The method of claim 1, wherein the detecting of the display event comprises receiving a signal from the electronic device.

6. The method of claim 1, wherein the detecting of the display event comprises at least one of detecting a change of a posture of the clock module or receiving a user input.

7. The method of claim 1, wherein the adjusting of the transparency of the at least one display area comprises converting the at least one display area from the transparent state into a translucent state or an opaque state.

8. The method of claim 1, further comprising converting the at least one display area into the transparent state when a designated time elapses while the information is being displayed.

9. An apparatus for displaying information, the apparatus comprising:
   a clock module comprising at least one clock hand indicating a current time;
   a display covering the clock module; and
   a controller configured to:
      control to maintain the display with a transparent state while the apparatus operates in an idle state,
      in response to receiving data from an electronic device, determine at least a partial area of the display as a notification area for displaying an object for notifying that the data is received,
      display, by adjusting a transparency of the notification area, the object within the notification area,
      in response to receiving a user input on the notification area, determine, based on a location of each of the at least one clock hand in the clock module, at least one display area for outputting information included in the data in an entire area of the display with the transparent state,
      display, by adjusting a transparency of the at least one display area, information within the at least one display area,
      change a location of the at least one display area based on a movement of each of the at least one clock hand, and
      display the information within the at least one display area located at the changed location.

10. The apparatus of claim 9, wherein the location of the at least one display area is different from the location of each of the at least one clock hand.

11. The apparatus of claim 9, wherein the at least one display area is not superimposed over each of the at least one clock hand.

12. The apparatus of claim 9, wherein the clock module comprises another controller and is only controlled by the other controller.

13. The apparatus of claim 12,
   wherein the other controller is configured to control the clock module in a mechanical manner, and
   wherein the controller is further configured to control the display in an electrical manner.

14. The apparatus of claim 9, wherein the controller is further configured to:
   detect a display event in response to at least one of receiving a signal from the electronic device, detecting a change of a posture of the clock module, or receiving a user input, and
   in response to the detecting of the display event, determine the at least one display area.

15. The apparatus of claim 9, wherein the controller is further configured to convert the at least one display area from the transparent state into a translucent state or an opaque state by adjusting the transparency of the at least one display area.

16. The apparatus of claim 9, wherein the controller is further configured to convert the at least one display area into the transparent state when a designated time elapses while the information is being displayed.

* * * * *